(12) United States Patent
Gu et al.

(10) Patent No.: US 7,976,343 B2
(45) Date of Patent: Jul. 12, 2011

(54) LAMP CONNECTION SOCKET, AND BACKLIGHT UNIT AND LIQUID CRYSTAL DISPLAY DEVICE USING THE SAME

(75) Inventors: Seung Man Gu, Gumi Si (KR); Young Kyu Park, Gyeongsangbuk-Do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/769,356

(22) Filed: Apr. 28, 2010

(65) Prior Publication Data

US 2010/0271833 A1    Oct. 28, 2010

Related U.S. Application Data

(62) Division of application No. 12/005,612, filed on Dec. 28, 2007, now Pat. No. 7,717,748.

(30) Foreign Application Priority Data

Jan. 16, 2007    (KR) .................. 10-2007-0004716

(51) Int. Cl.
H01R 13/66    (2006.01)

(52) U.S. Cl. ................................. 439/620.02

(58) Field of Classification Search ............ 439/620.02, 439/637, 66; 345/87; 362/260, 249, 225, 362/97; 315/246
See application file for complete search history.

(56) References Cited

U.S. PATENT DOCUMENTS

| | | | |
|---|---|---|---|
| 5,688,139 A | 11/1997 | Gust et al. | |
| 6,624,554 B2 | 9/2003 | Holzer | |
| 6,802,730 B2 * | 10/2004 | Chang | 439/236 |
| 2005/0127848 A1 | 6/2005 | Park et al. | |
| 2006/0273739 A1 | 12/2006 | Park | |
| 2006/0279957 A1 * | 12/2006 | Kwon et al. | 362/378 |
| 2007/0046171 A1 * | 3/2007 | Miyazono | 313/493 |

* cited by examiner

*Primary Examiner* — Alexander Gilman
(74) *Attorney, Agent, or Firm* — McKenna Long & Aldridge LLP

(57) ABSTRACT

A lamp-connection socket for a lamp for a display device, and a backlight unit and LCD device using the same are disclosed. The lamp-connection socket includes a body that includes a lamp receiving portion that supports an end portion of a lamp; a first terminal that extends from within the body to the outside of the body to receive a potential for driving the lamp; a balance device arranged within the body and electrically connected to the first terminal; and a clip arranged in the body that releasably clamps a lamp electrode at the end of the lamp, the clip electrically connected to the balance device.

3 Claims, 9 Drawing Sheets

LAMP CONNECTION SOCKET, AND BACKLIGHT UNIT AND LIQUID CRYSTAL DISPLAY DEVICE USING THE SAME

This application is a Divisional of application Ser. No. 12/005,612 filed Dec. 28, 2007 now U.S. Pat. No.7,717,748, now allowed, which claims priority to Korean Patent Application No. 10-2007-0004716, filed Jan. 16, 2007, all of which are hereby incorporated by reference for all purposes as if fully set forth herein.

BACKGROUND OF THE INVENTION

1. Field of the Invention

The present invention relates LCD devices and more particularly to a lamp-connection socket, and a backlight unit and LCD device using the same.

2. Discussion of the Related Art

Generally, a liquid crystal display (LCD) device displays desired images by controlling the transmittance of light emitted from a backlight unit.

Backlight units are generally classified as either edge-type backlight units or direct-type backlight units depending on the position of fluorescent lamp.

The edge-type backlight unit is generally used for small-sized LCD devices such as notebook computers, while the direct-type backlight unit is more commonly used for large-sized LCD devices such as televisions.

The related art direct-type backlight unit includes a plurality of fluorescent lamps where high voltage electrical power is provided from an inverter through a wire to each of the fluorescent lamps. The related art direct-type backlight unit uses a plurality of transformers to drive the fluorescent lamps, resulting in complicated structures and high fabrication cost.

To simplify the structure and decrease the fabrication cost in the related art direct-type backlight unit, the direct-type backlight units have been developed that use a parallel driving method in which the plurality of fluorescent lamps are driven in parallel.

The direct-type backlight unit using the parallel driving method is provided with an inverter that includes a common electrode and a transformer. The common electrode is connected to each of the respective fluorescent lamps, and the transformer applies a high voltage to the common electrode. However, the direct-type backlight unit of the parallel driving method has the disadvantage that some of the fluorescent lamps may not turn on upon application of power to the common electrode, because the current applied through the common electrode will flow largely to those fluorescent lamps having a low resistance value after being initially turned on.

In the case of the direct-type backlight unit employing the parallel driving method, a ballast capacitor is connected to an electrode included in each of the fluorescent lamps. Thus, a balanced current may be maintained within the respective fluorescent lamps, even when the plurality of fluorescent lamps is driven in parallel. The ballast capacitor may be included in the inverter connected to the transformer supplying the voltage to the electrode of each fluorescent lamp, or may be formed in a PCB substrate holding the common electrode.

Accordingly, the related art direct-type backlight unit using the parallel driving method has the following disadvantages.

In the related art direct-type backlight unit using the parallel driving method, the inverter or the PCB having the common electrode is increased in size due to the area occupied by the ballast capacitor and the connection structure of lamp is complicated.

SUMMARY OF THE INVENTION

Accordingly, the present invention is directed to a lamp-connection socket, and a backlight unit and LCD device using the same that substantially obviate one or more problems due to limitations and disadvantages of the related art.

An advantage of the present invention is to provide a lamp-connection socket that is suitable for simplifying a lamp-connection structure, and a backlight unit and LCD device using the same.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, a lamp-connection socket for a lamp for a display device includes: a body that includes a lamp receiving portion that supports an end portion of a lamp; a first terminal that extends from within the body to the outside of the body to receive a potential for driving the lamp; a balance device arranged within the body and electrically connected to the first terminal; and a clip arranged in the body that releasably clamps a lamp electrode at the end of the lamp, the clip electrically connected to the balance device.

In another aspect of the present invention socket support board for a display device includes: a socket substrate; a plurality of lamp connection sockets supported on the socket substrate, wherein each lamp connection socket includes: a body that includes a lamp receiving portion that supports an end portion of a lamp; a first terminal that extends from within the body to the outside of the body to receive a potential for driving the lamp; a balance device arranged within the body and electrically connected to the first terminal; and a clip arranged in the body that releasably clamps a lamp electrode at the end of the lamp, the clip electrically connected to the balance device; and a common line on the socket substrate that connects to the first terminal of each lamp connection socket to connect the lamp sockets in parallel.

In another aspect of the present invention a backlight unit for a display device includes: a plurality of lamps arranged in parallel for emitting light onto the display device; a first socket support substrate that supports a plurality of first lamp connection sockets, each first lamp connection socket for supporting a first end of a corresponding lamp of the plurality of lamps; a second socket support substrate that supports a plurality of second lamp connection sockets, each second lamp connection socket for supporting an end opposite the first end of a corresponding lamp of the plurality of lamps; a first common line on the first socket support substrate that connects the first lamp connection sockets in parallel; a second common line on the second socket support substrate that connects the second lamp connection sockets in parallel, wherein each lamp connection socket of the first and second lamp connection sockets includes: a body that includes a lamp receiving portion that supports an end portion of a corresponding lamp; a first terminal that extends from within the body to the outside of the body and receive a potential for driving the corresponding lamp; a balance device arranged within the body and electrically connected to the first terminal; and a clip arranged in the body that releasably clamps a lamp electrode at the end of the lamp, the clip electrically connected to the balance device, wherein the first terminals of the first lamp connection sockets are connected to the first common line, and the first terminals of the second lamp connection sockets are connected to the second common line.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, an example of which is illustrated in the accompanying drawings. Wherever possible, the same reference numbers will be used throughout the drawings to refer to the same or like parts.

Hereinafter, a lamp-connection socket according to embodiments of the present invention, and a backlight unit and LCD device using the same will be described with reference to the accompanying drawings.

Figure 1:
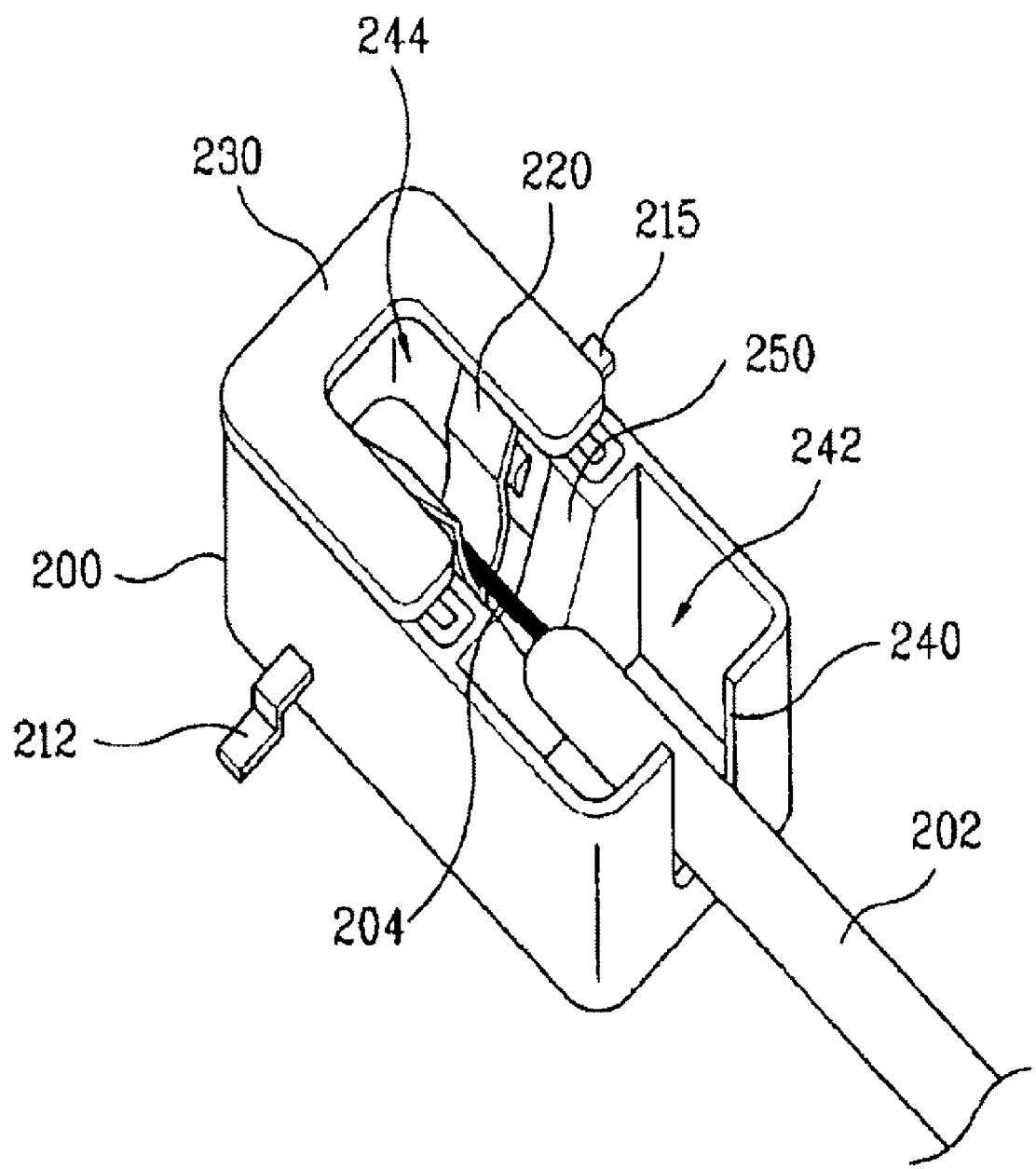
FIG. 1 is a perspective view schematically illustrating a lamp-connection socket according to the first embodiment of the present invention.
Figure 2:
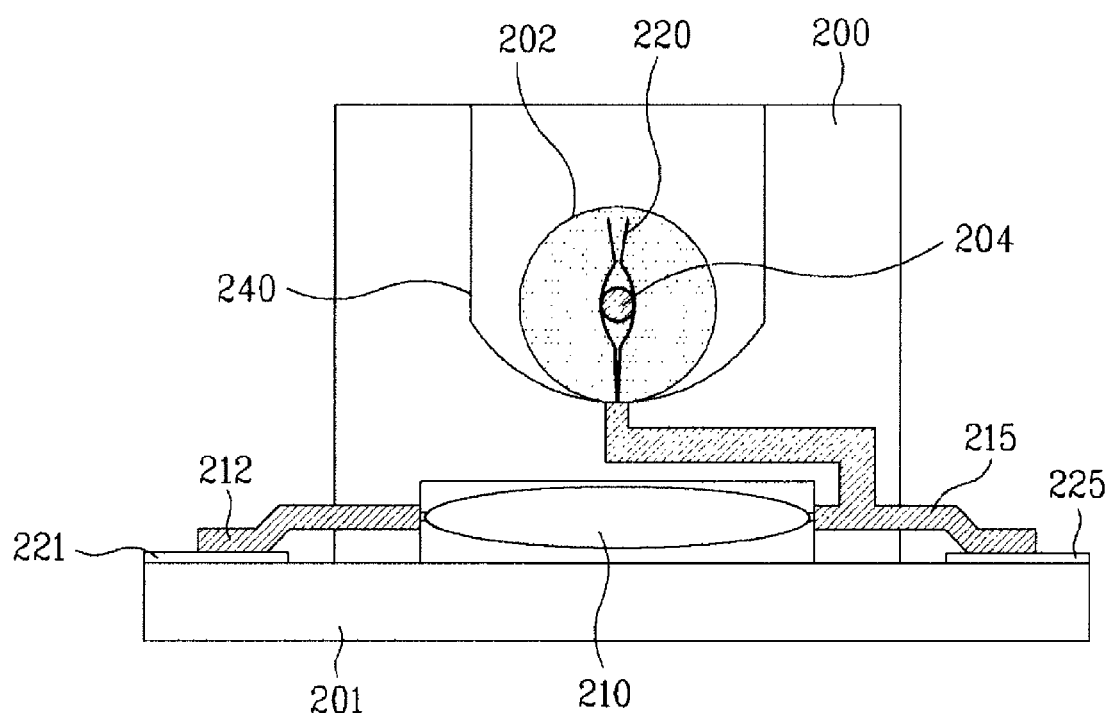
FIG. 2 is a view illustrating an arrangement structure in a lamp-connection socket according to an embodiment of the present invention.

FIG. 1 is a perspective view schematically illustrating a lamp-connection socket according to the first embodiment of the present invention. FIG. 2 is a view illustrating an arrangement structure in a lamp-connection socket shown in FIG. 1.

As shown in FIGS. 1 and 2, a lamp-connection socket according to the first embodiment of the present invention includes a body 200 provided on a substrate (or balance PCB, 201) to support an end portion of lamp 202; a balance device 210 supplied with a lamp-driving voltage; and a clip 220 to supply the lamp-driving voltage supplied from the balance device 210 to the lamp 202.

The body 200 includes: a lamp supporter 240 to support the lamp 202; a lamp-electrode supporter 250 to support a lamp electrode 204; a lamp-electrode fixer 230 to fix the lamp electrode 204 in the clip 220; and an electrode-contact part 244 provided with the clip 220.

The lamp supporter 240 supports the side of lamp 202 that is detachably mounted on the clip 220.

The lamp-electrode supporter 250 supports the lamp electrode 204 that protrudes from an end of the lamp 202.

The lamp-electrode fixer 230 is removably supported on the body 200 so that the lamp electrode 204 may be detached from the clip 220. That is, as the lamp-electrode fixer 230 is moved downward, the lamp electrode 204 is held fixed to electrically connect to the clip 220. By moving the lamp-electrode fixer 230 upward, the lamp electrode 204 is released and may be detached from the clip 220. To provide the above-described release function for the electrode lamp fixer the body 200 may be provided with a guide that allows upward and downward movement of the lamp-electrode fixer 230.

A lamp-receiving part 242 is provided in the body 200 between the lamp supporter 240 and the lamp-electrode supporter 250, wherein the end of lamp 202 is positioned at the lamp-receiving part 242.

The clip 220 provided in the electrode-contact part 244 is electrically connected to the lamp electrode 204. For accomplishing this connection, the clip 220 includes an elastic portion having a predetermined curvature and formed of a conductive metal material with a predetermined elasticity and a sliding portion that is inclined at a predetermined angle from an end of elastic portion to slide the lamp electrode 202 into the elastic portion.

The clip 220 is maintained in the electric connection state with the lamp electrode 204 except when the lamp electrode 204 is detached from the clip 220. That is, when the clip fixer 230 is moved downward, the clip 220 clamps the lamp electrode 204 so that the lamp electrode 204 is fixed stably to resist movement tending to disturb the electric connection with the clip 200. By moving the lamp-electrode fixer 230 upward, the clip 220 is unclamped from the lamp electrode 204 so that the lamp electrode 204 may be easily detached from the clip 220.

The balance device 210 includes: a first terminal 212 exposed to the exterior of the body 200 by penetrating one side of the body 200 to allow supplying the terminal with the lamp-driving voltage; and a second terminal 215 electrically connected to the clip 220 and exposed to the exterior of the body 200 by penetrating the other side of the body 200. In the illustrated embodiment the balance device 210 is an impedance device that maintains a balanced current supplied to the lamp 202 when connected in a parallel circuit. For example, the balance device 210 may include a high-voltage capacitor or inductor.

The balance device 210 is integrated with the body 200 so that the balance device 210 uniformly maintains the balance of current supplied to the lamp 202 by the lamp-driving voltage supplied to the lamp 202 through the clip 220. The balance device 210 may be provided at any one of the lower side, the lateral side and the upper side of the body 200.

The first terminal 212 of the balance device 210 is electrically connected to a common voltage line 221 formed in the substrate 201 by a suitable method such as by soldering. As the second terminal 215 is exposed to the exterior by penetrating the other side of the body 200, the second terminal 215 is electrically connected to a dummy contact point 225 formed in the substrate 201. In the illustrated embodiment, the dummy contact point 225 is not supplied with a voltage and functions as a terminal to fix the body 200 onto the substrate 201.

In the lamp-connection socket according to the first embodiment of the present invention, the clip 220 connected to the lamp electrode 204 and the balance device 210 to uniformly maintain the current balance in the lamp 202 are integrated with the body 200 so that the lamp-connection structure is simplified.

Figure 3:
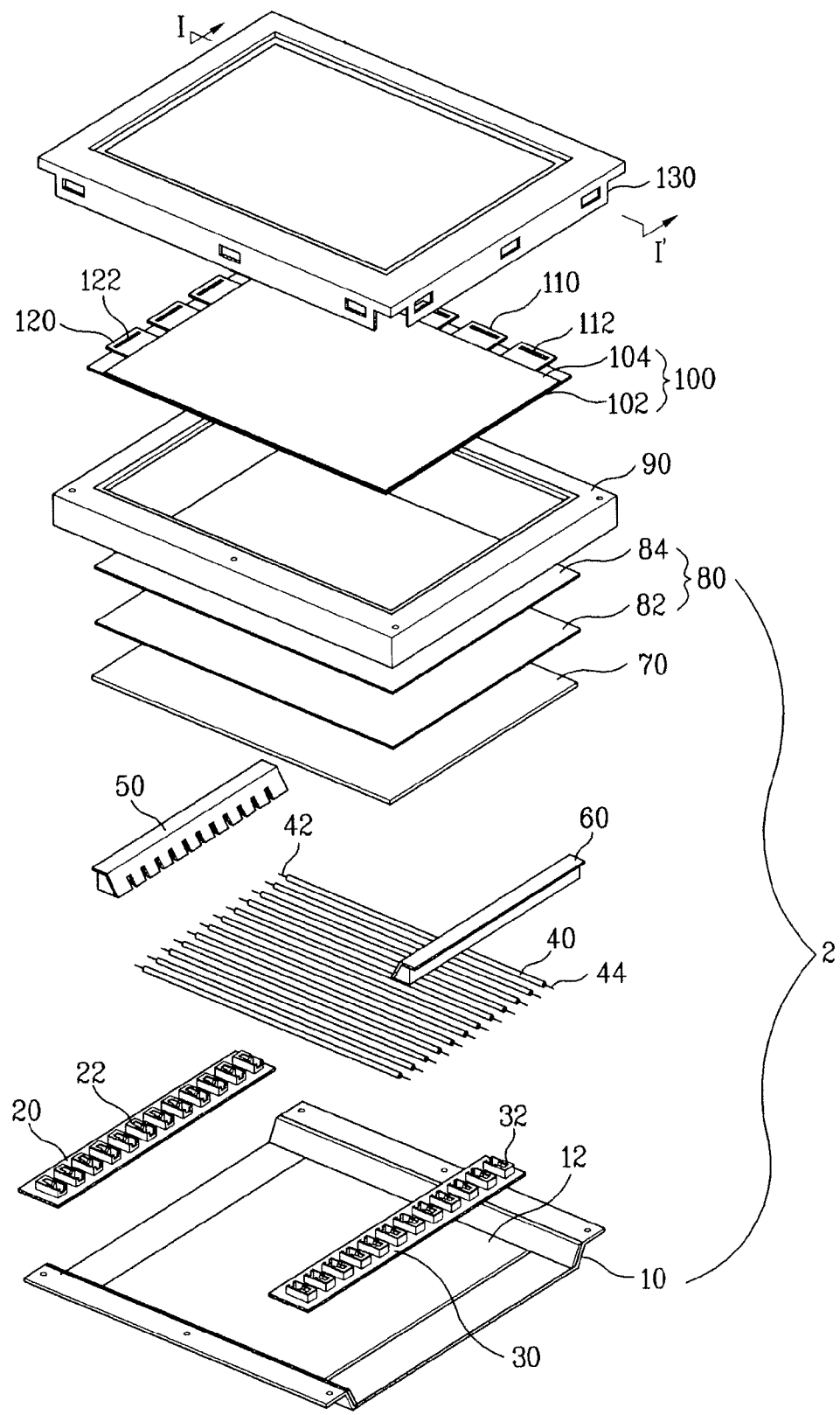
FIG. 3 is an exploded perspective view schematically illustrating a backlight unit according to an embodiment of the present invention and an LCD device using the same.
Figure 4:
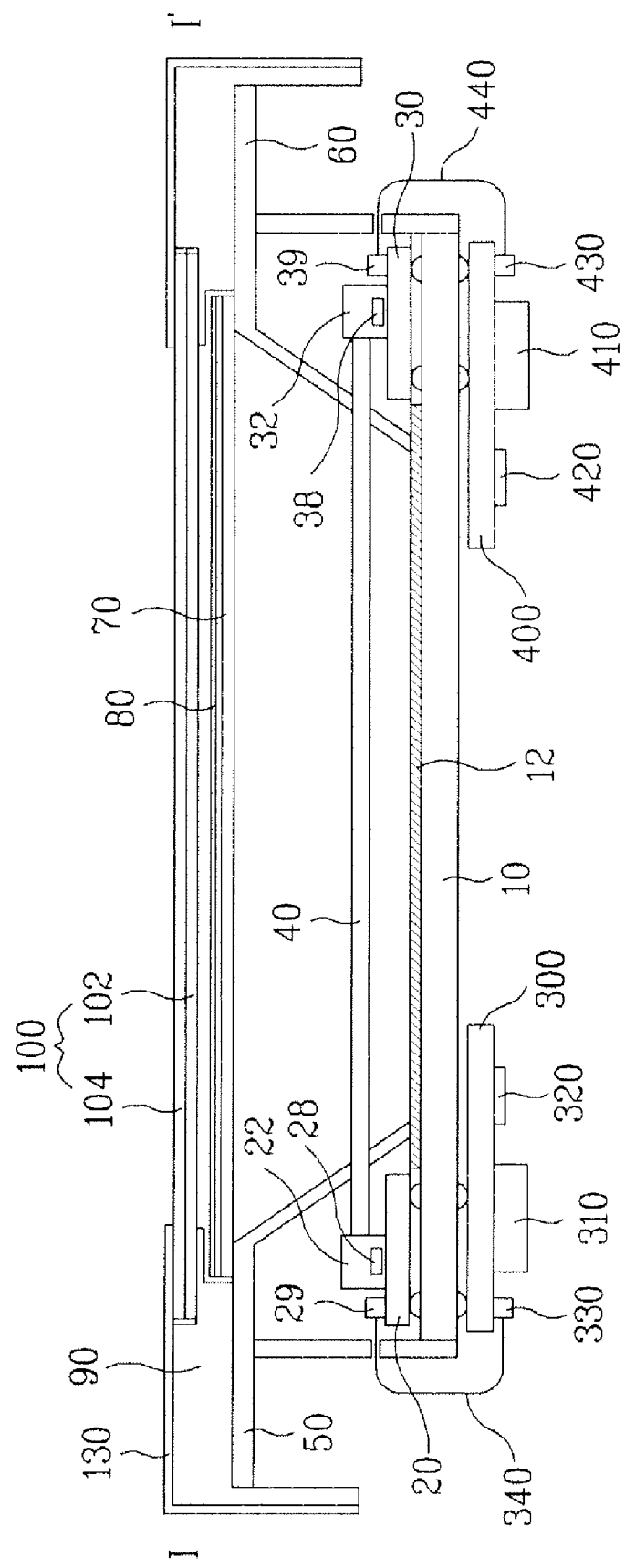
FIG. 4 is a cross sectional view along I-I' of FIG. 3.

FIG. 3 is an exploded perspective view schematically illustrating a backlight unit according to the first embodiment of the present invention and an LCD device using the same. FIG. 4 is a cross sectional view along I-I' of FIG. 3.

Referring to FIGS. 3 and 4, the backlight unit according to the first embodiment of the present invention and the LCD device using the same include a backlight unit 2, a panel guide 90, an LCD panel 100, and a case 130.

The backlight unit 2 includes: a plurality of lamps 40, each lamp 40 including first and second electrodes 42 and 44 therein; a first socket unit including a plurality of first sockets 22, wherein each of the first sockets 22 is connected to the first electrode 42 of each lamp 40; a first balance device 28, integrated with each of the first sockets 22 to supply a first lamp-driving voltage provided from the exterior to the first electrode 42 of each lamp; a second socket unit including a plurality of second sockets 32, wherein each of the second sockets 32 is connected to the second electrode 44 of each lamp 40; and a second balance device 38 integrated with each of the second sockets 32, to supply a second lamp-driving voltage provided from the exterior to the second electrode 44 of each lamp 40.

Figure 5:
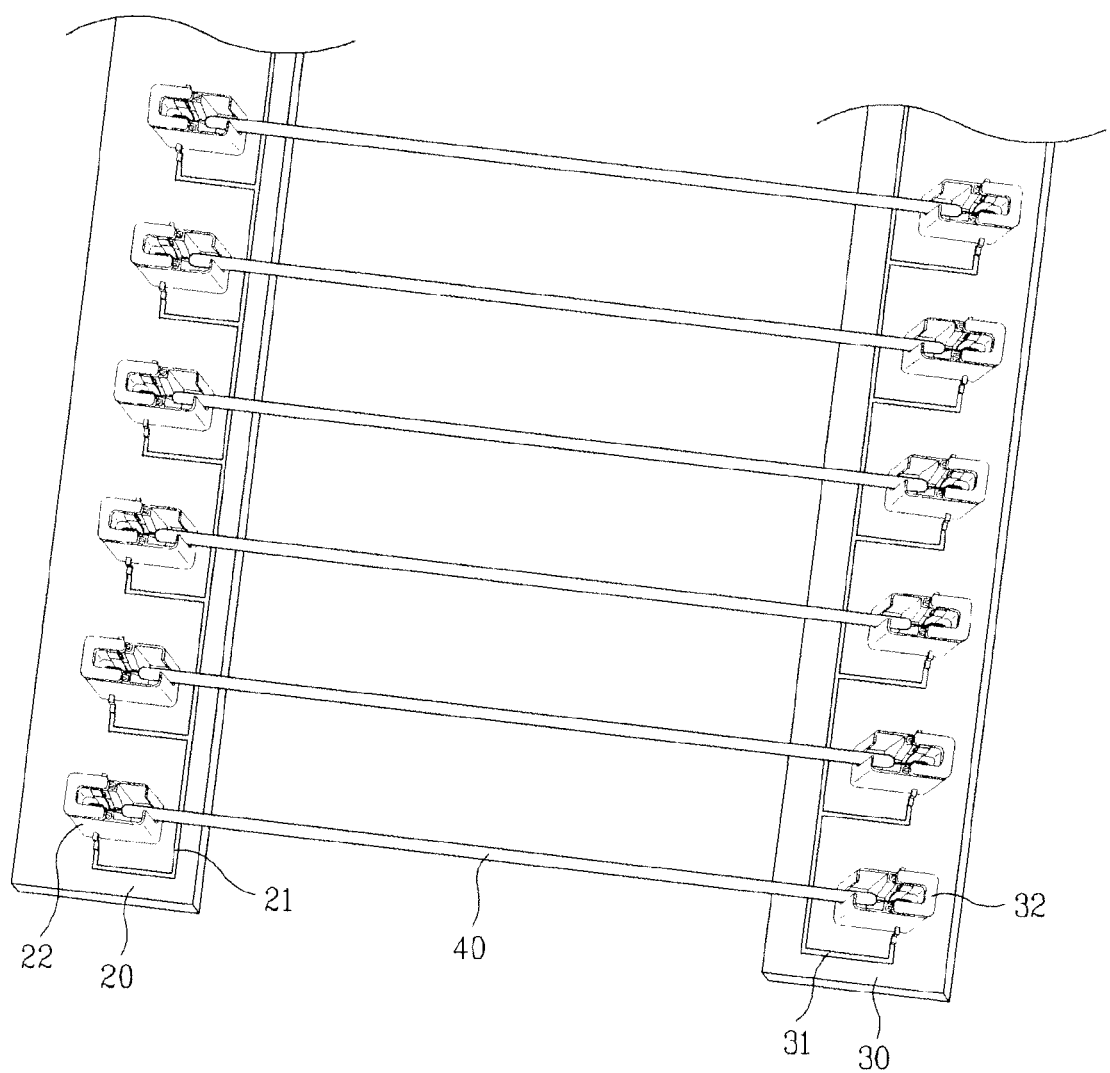
FIG. 5 is a perspective view illustrating a connection structure between a socket unit and a lamp shown in FIG. 3.

As shown in FIG. 5, the first socket unit includes a first substrate 20 that includes a first common line 21 that distributes the first lamp-driving voltage and a plurality of first sockets 22 that include the plurality of first balance devices 28 to supply the first lamp-driving voltage from the first common line 21 to the first electrode 42.

Each of the first sockets 22 includes: a first body arranged on the first substrate 20 to support one end portion of the lamp 40; a first clip electrically connected to the first electrode 42 of the lamp 40 and arranged in the first body; and a first balance device 28 that electrically connects to the first common line 21 and the first clip. The first balance device 28 may include a capacitor or inductor. Each of the first sockets 22 is identical in structure to the lamp-connection socket according to the embodiment of the present invention shown in FIGS. 1 and 2.

The second socket unit includes: a second substrate 30 including a second common line 31 supplied with the second lamp-driving voltage; and the plurality of second sockets 32 including the plurality of second balance devices 38 to supply the second lamp-driving voltage from the second common line 31 to the second electrode 44 of the lamp 40.

Each of the second sockets 32 includes: a second body arranged on the second substrate 30 to support the other end portion of the lamp 40; a second clip electrically connected to the second electrode 44 of the lamp 40 and arranged in the second body; and the second balance device 38 electrically connected to the second common line 31 and the second clip. The second balance device 38 may include a capacitor or inductor. Each of the second sockets 32 is identical in structure to the lamp-connection socket according to the embodiment of the present invention shown in FIGS. 1 and 2.

Each of the lamps 40 is detachably supported between the first and second sockets 22 and 32 respectively disposed on the first and second substrates 20 and 30. Each of the lamps 40 may be a Cold Cathode Fluorescent Lamp (CCFL). The plurality of lamps 40 are driven by the first and second lamp-driving voltages supplied from the respective sockets 22 and 32 to thereby emit light onto the LCD panel 100.

The backlight unit 2 includes: a cover 10 that overlaps the first and second socket units and the plurality of lamps 40 arranged between the first and second socket units; a first lateral frame 50, arranged at one side of the cover 10 to overlap the first socket unit and one end portion of each lamp 40; a second lateral frame 60, arranged at the other side of the cover 10 to overlap the second socket and the other end portion of each lamp 40; a light-diffusion plate 70 provided opposite an entire surface of the cover 10 and on opposite side the plurality of lamps 40 from the cover 10; and at least one optical sheet 80 provided on the light-diffusion plate 70.

The cover 10 includes: a bottom surface facing the plurality of lamps 40; an inclined surface being inclined at a predetermined angle from the upper and lower parts of the bottom surface along a longitudinal direction of the lamps 40; and an extension portion extending from the inclined surface and substantially parallel to the bottom surface. A reflective sheet 12 is adhered to the bottom and inclined surfaces of the cover 10 to reflect the light emitted from each lamp 40 towards the LCD panel 100. In the illustrated embodiment, the reflective sheet 12 does not extend to cover predetermined regions at opposite edges of the bottom surface of the cover 10 near the ends of the lamps 40. In particular, the predetermined regions not covered by the reflective sheet 12 at each of the edges of the bottom surface of the cover 10 are substantially the same in size and overlap with each of the first and second socket units, respectively.

The first lateral frame 50 is provided at one edge of the cover 10 so that the first lateral frame 50 covers one end portion of the lamp 40 mounted on the first socket unit. The first lateral frame 50 may include an inclined surface that reflects incident light emitted from the lamp 40 and a lamp hole formed in the inclined surface to accommodate the body of the lamp 40. The first lateral frame 50 is fixed in one side of the cover 10 using a screw or other suitable attachment device.

The second lateral frame 60 is provided at the opposite edge of the cover 10 from the first lateral frame 50 and covers the other end portion of the lamp 40 mounted on the second socket unit. The second lateral frame 60 includes: an inclined surface to reflect the light emitted from the lamp 40; and a lamp hole arranged in the inclined surface to accommodate the lamp 40. The second lateral frame 60 is fixed in the other side of the cover 10 from the first lateral frame 50 using a screw or other suitable attachment device.

The cover provided with the first and second lateral frames 50 and 60 forms a rectangular frame having a frontal opening towards the LCD panel 100.

The light-diffusion plate 70 is provided on a frontal opening formed by the cover 10 and the first and second lateral frames 50 and 60. That is, the light-diffusion plate 70 is supported on the extension of the cover 10 and the upper sides of the first and second lateral frames 50 and 60. A plurality of protrusions may be formed on the center or other portion of the cover 10 to prevent the light-diffusion plate 70 from sagging. The light-diffusion plate 70 diffuses the light emitted from the plurality of lamps 40 to the entire area of the LCD panel 100.

The plurality of optical sheets 80 direct the diffused light to travel vertically towards the LCD panel 100. For accomplishing the direction of the diffused light, the plurality of optical sheets 80 may include at least one prism sheet 82, 84 to concentrate the light diffused by the light-diffusion plate 70.

As shown in FIG. 4, the backlight unit 2 includes: a first inverter that generates the first lamp-driving voltage; a first wire 340 that supplies the first lamp-driving voltage generated in the first inverter to the first socket unit; a second inverter that generates the second lamp-driving voltage; and a second wire 440 that supplies the second lamp-driving voltage generated in the second inverter to the second socket unit.

The first inverter includes: a first inverter substrate 300 arranged at one side of the rear surface of the cover 10; a first inverter IC 320 that converts direct current (DC) power into alternating current (AC) power; a first transformer 310 that steps up the voltage of the AC power to the first lamp-driving voltage; and a first wire connector 330 that outputs the first lamp-driving voltage to the first socket unit.

The first inverter IC 320 is arranged in the first inverter substrate 300, wherein the first inverter IC 320 coverts input power supplied from the exterior to the AC power.

The first transformer 310 steps up the voltage of the AC power supplied from the first inverter IC 320 to the first lamp-driving voltage, and the first lamp-driving voltage is supplied to the first wire connector 330.

The first wire 340 passing through one side of the first lateral frame 50 electrically connects the first wire connector 330 with a second wire connector 29 arranged on the first substrate 20 of the first socket unit. Accordingly, the first wire 340 supplies the first lamp-driving voltage from the first transformer 310 and the first wire connector 330 to the second wire connector 29. The second wire connector 29 is electrically connected to the first common line 21 formed in the first substrate 20.

The second inverter includes: a second inverter substrate 400 that is arranged at the other side of the rear surface of the cover 10 from the first inverter substrate 300; a second inverter IC 420 that converts DC power into AC power; a second transformer 410 that steps up the voltage of the AC power to the second lamp-driving voltage; and a third wire connector 430 that outputs the second lamp-driving voltage to the second socket unit.

The second inverter IC 420 is arranged on the second inverter substrate 400, wherein the first inverter IC 320 coverts input power supplied from the exterior to the AC power.

The second transformer 410 steps up the voltage of the AC power supplied from the second inverter IC 420 to the second lamp-driving voltage and the second lamp-driving voltage to the third wire connector 430.

The second wire 440 passing through one side of the second lateral frame 60 electrically connects the third wire connector 430 with a fourth wire connector 39 arranged in the second substrate 30 of the second socket unit. Accordingly, the second wire 440 supplies the second lamp-driving voltage from the second transformer 410 and the third wire connector 430 to the fourth wire connector 39. The fourth wire connector 39 is electrically connected to the second common line 31 formed on the second substrate 30.

The phase of the first lamp-driving voltage outputted from the first inverter is opposite to the phase of the second lamp-driving voltage outputted from the second inverter. That is, when the first lamp-driving voltage outputs a positive (+) AC voltage, the second lamp-driving voltage outputs a negative (−) AC voltage. When the first lamp-driving voltage outputs a negative (−) AC voltage, the second lamp-driving voltage outputs a positive (+) AC voltage.

When the first lamp-driving voltage outputted from the first inverter is the AC voltage, the second lamp-driving voltage outputted from the second inverter may be the ground voltage. When the first lamp-driving voltage outputted from the first inverter is the ground voltage, the second lamp-driving voltage outputted from the second inverter may be the AC voltage. When the ground voltage is used as described, the one of the first or second inverter that supplies the ground voltage to the first or second electrode 42 or 44 included in each lamp may be provided with a ground pattern and without the inverter IC and transformer. For example, if the AC voltage is supplied to the first electrode 42 of each lamp and the ground voltage is supplied to the second electrode 44 of each lamp, the first inverter is provided with the first inverter IC 320 and the first transformer 310, while the second inverter is provided with a ground pattern and without the second inverter IC 420 and without the second transformer 410.

The backlight unit 2 energizes the plurality of lamps 40 using the first and second lamp-driving voltages respectively supplied to the first and second socket units from the first and second inverters and the LCD panel 100 is illuminated with the light generated from the energized lamps 40.

The panel guide 90 covers the edges and lateral sides of the light-diffusion plate 70 and optical sheets 80. The panel guide 90 is mounted on the extension of the cover 10 so that the panel guide 90 covers the lateral side of the cover 10. The panel guide 90 is provided with a panel supporter that supports the LCD panel 100. The panel supporter includes a bent end portion to support the lateral sides of the LCD panel 100 and the non-display area of the rear surface of the LCD panel 100.

The LCD panel 100 is disposed on the panel supporter of the panel guide 90. The LCD panel 100 displays images by controlling the transmittance of light emitted from the backlight unit 2.

For displaying images, the LCD panel includes: a lower substrate 102; an upper substrate 104; a liquid crystal layer formed between the lower and upper substrates 102 and 104; and spacers to maintain a predetermined interval between the lower and upper substrates 102 and 104.

The upper substrate 104 includes a color filter; a black matrix; and a common electrode.

The lower substrate 102 includes a thin film transistor (TFT) formed in each of cell region defined by gate and data lines; and a pixel electrode electrically connected to the thin film transistor (TFT). The thin film transistor (TFT) supplies a video signal provided from the data line to the pixel electrode in response to a gate-on voltage supplied from the gate line. Depending on the mode of operation of the liquid crystal, the common electrode may be formed on the lower substrate 102 rather than on the upper substrate 104.

In the non-display area of the lower substrate 102, a data pad region connects to the respective data lines, and a gate pad region connects to the respective gate lines.

A plurality of data circuit films 110 are adhered to the data pad region, and the data ICs 112 that supply video signals to the data lines are formed on the data circuit films. Each of the data circuit films 110 may be formed using Tape Carrier Package (TCP) or Chip On Film technology. Each data circuit film 110 supplies a data signal provided from a data PCB (not shown) to the data IC 112, and supplies the video signal outputted from the data IC 112 to each data line of the LCD panel 100. The data IC 112 may be formed in the lower substrate 102 using Chip-On Glass technology (COG).

A plurality of gate circuit films 120 are adhered to the gate pad region and gate ICs 122 that supplying the gate-on voltage to the gate lines are formed on the gate circuit films 120. Each of the gate circuit films 120 may be formed using TCP or Chip On Film technology. Each gate circuit film 120 supplies a gate control signal provided from the data PCB through the data circuit film 110 and the lower substrate 102 to the gate IC 122, and supplies the gate-on voltage outputted from the gate IC 122 to each gate line. The gate IC 122 may be formed in the lower substrate 102 using COG, or may be formed on the lower substrate 102 by the process of forming the thin film transistor.

The case 130 is curved to cover the frontal non-display area of the LCD panel 100 and the lateral side of the cover 10. The case 130 is connected to and fixed in the panel guide 90 that covers the lateral side of the cover 10.

Figure 6:
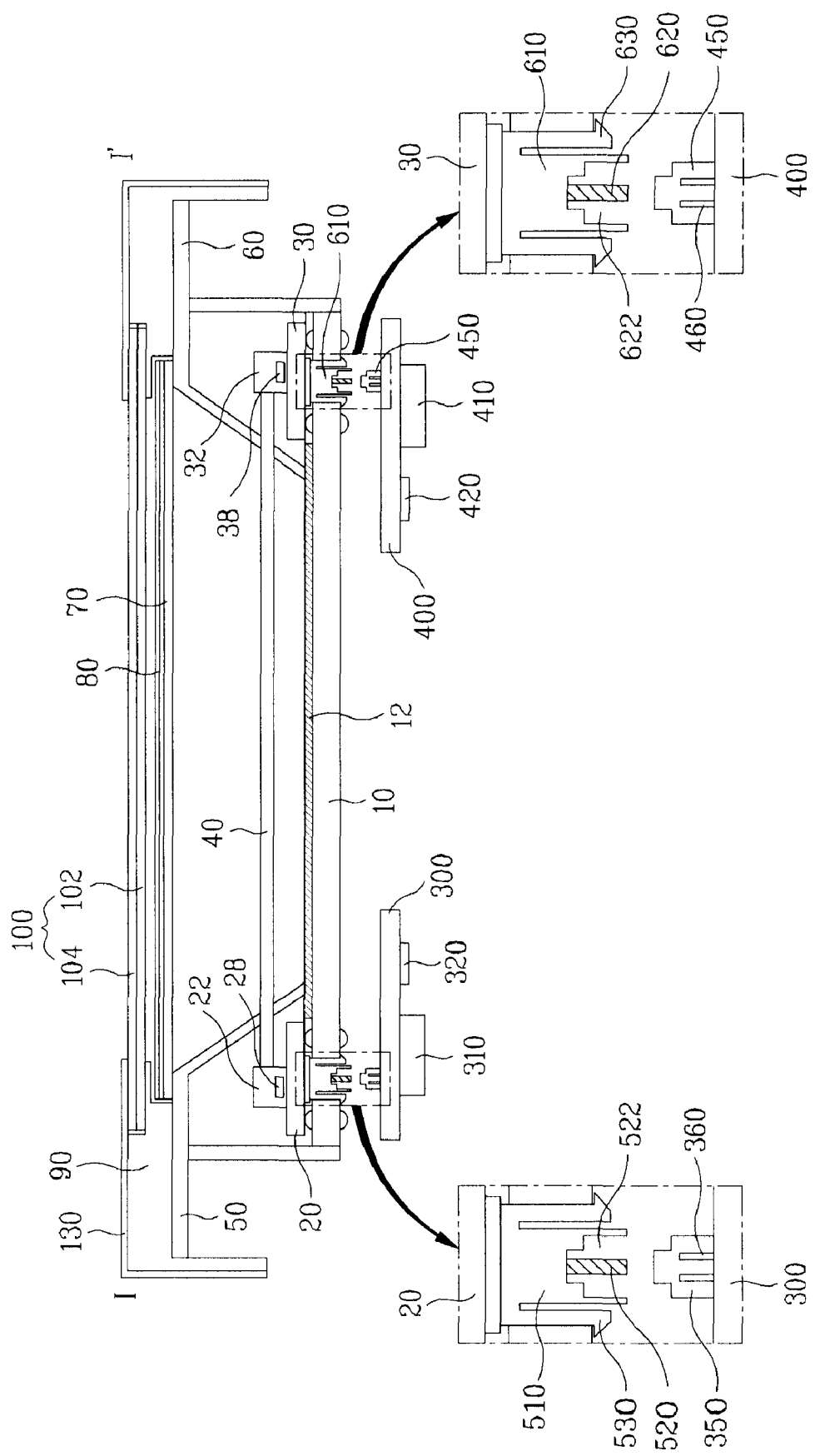
FIG. 6 is a cross sectional view schematically illustrating a backlight unit according to another embodiment of the present invention and an LCD device using the same.

FIG. 6 is a cross sectional view schematically illustrating a backlight unit according to another embodiment of the present invention and an LCD device using the same.

Except for the connection structure between an inverter and a socket unit, the backlight unit according to the embodiment of the present invention and the LCD device using the same shown in FIG. 6 are identical in structure to the backlight unit according to the embodiment of the present invention and the LCD device using the same shown in FIG. 4. Accordingly, details of the embodiment illustrated in FIG. 6 other than those for the connection between the inverter and the socket unit can be understood from the above described description of FIGS. 3, 4, and 5.

The backlight unit according to the embodiment of the present invention shown in FIG. 6 uses a pin-connection method rather than the wire-connection method described above. That is, in the backlight unit of FIG. 6, the inverter is electrically connected to the socket unit using a pin-connection method.

For accomplishing the pin connection, the backlight unit according to another embodiment of the present invention includes a first pin connector 350, arranged on a first inverter to connect the first lamp-driving voltage; a second pin connector 510 that penetrates a bottom surface of a cover 10 to connect to the first pin connector 350; a third pin connector 450, arranged in a second inverter, to connect a second lamp-driving voltage; and a fourth pin connector 610 that penetrates a bottom surface of a cover 10 to connect to the third pin connector 450.

The first pin connector 350 is provided on the rear surface of a first inverter substrate 300 facing the cover 10. The first pin connector 350 includes a plurality of first pins 360 that supply the first lamp-driving voltage to the second pin connector 510. The first pin connector 350 supplies the first lamp-driving voltage provided to the first pin 360 from a first transformer 310 via a hole included in the first inverter substrate 300 to the second pin connector 510.

The second pin connector 510 passes through a hole in the cover 10 and is provided on a first substrate 20 of a first socket unit. The second pin connector 510 includes: a first insertion hole into which the first pin connector 350 is inserted; a second pin 520 formed as a protruding shape in the first insertion hole 522 that electrically connects to the first pins 360 of the first pin connector 350; and a plurality of first hooks 530 to fix the first substrate 20 of the first socket unit to the cover 10.

The first pin connector 350 is inserted into and fixed in the first insertion hole 522.

As the second pin 520 is formed as the protruding shape in the first insertion hole 522, the second pin 520 supplies the first lamp-driving voltage, provided from the first pins 360 of the first pin connector 350 inserted into and fixed in the first insertion hole 522 to a first common line 21 of the first substrate 20.

As the plurality of first hooks 530 are connected to the rear surface of the cover 10 by penetrating the cover 10, the first substrate 20 is mounted and affixed onto the cover 10.

The third pin connector 450 is provided on the rear surface of a second inverter substrate 400 facing the cover 10. The third pin connector 450 includes a plurality of third pins 460 that supply the second lamp-driving voltage to the fourth pin connector 610. The third pin connector 450 supplies the second lamp-driving voltage provided to the third pin 460 from a second transformer 410 via a hole included in the second inverter substrate 400 to the second pin connector 610.

The fourth pin connector 610 passes through a hole in the cover 10 and is provided on a second substrate 30 of a second socket unit. The fourth pin connector 610 includes: a second insertion hole into which the third pin connector 450 is inserted; a fourth pin 620 formed as a protruding shape in the second insertion hole 622 that electrically connects to the third pins 460 of the third pin connector 450; and a plurality of second hooks 630 to fix the second substrate 30 of the first socket unit to the cover 10.

The third pin connector 450 is inserted into and fixed in the second insertion hole 622.

As the fourth pin 620 is formed as the protruding shape in the second insertion hole 622, the fourth pin 620 supplies the second lamp-driving voltage, provided from the third pins 460 of the third pin connector 450 inserted into and fixed in the second insertion hole 622 to the second common line 31 of the second substrate 30.

As the plurality of second hooks 630 are connected to the rear surface of the cover 10 by penetrating the cover 10, the second substrate 30 is mounted and affixed onto the cover 10.

Figure 7:
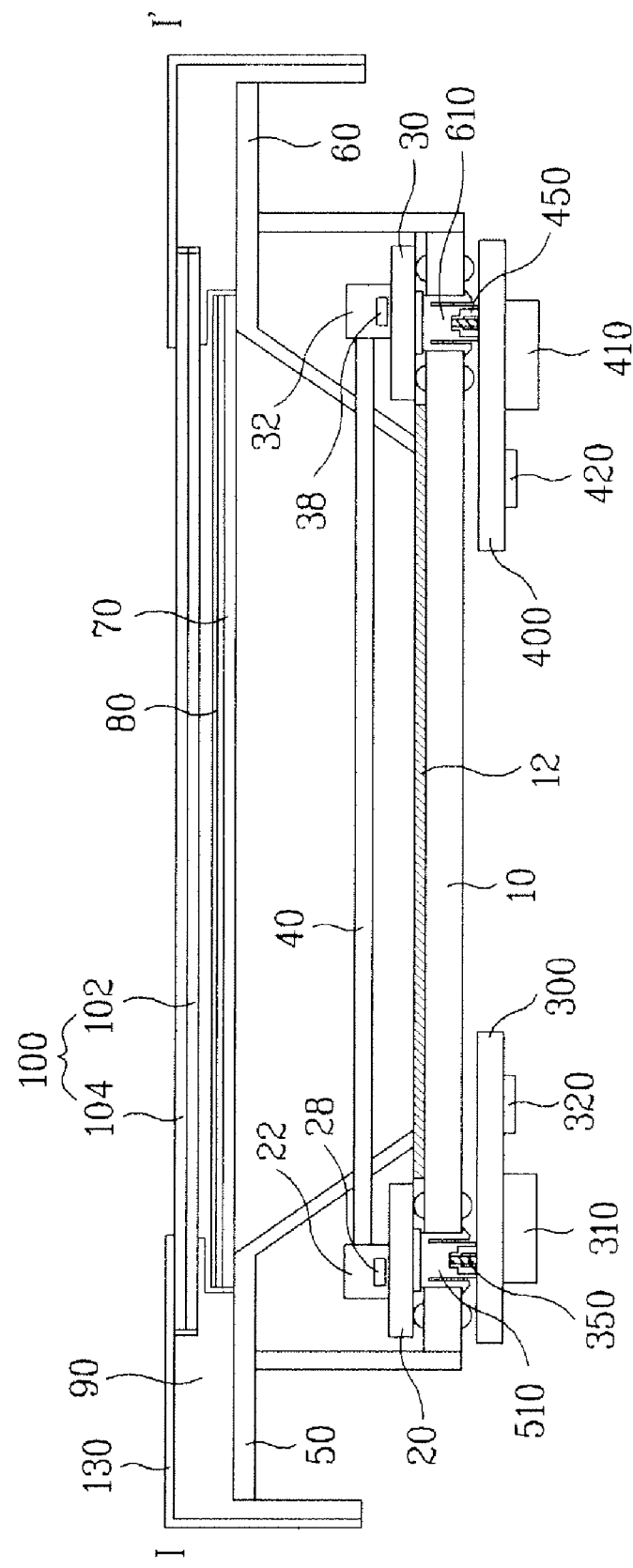
FIG. 7 is a cross sectional view illustrating a connection structure between an inverter and the socket unit shown in FIG. 6.

In the backlight unit according to the second embodiment of the present invention and the LCD device using the same, the inverter is electrically connected to the socket unit by the pin-connection method shown in FIG. 7, so that it is possible to simplify the connection structure between the inverter and the socket unit and to minimize the leakage current by minimizing the transmission distance of first and second lamp-driving voltages.

Figure 8:
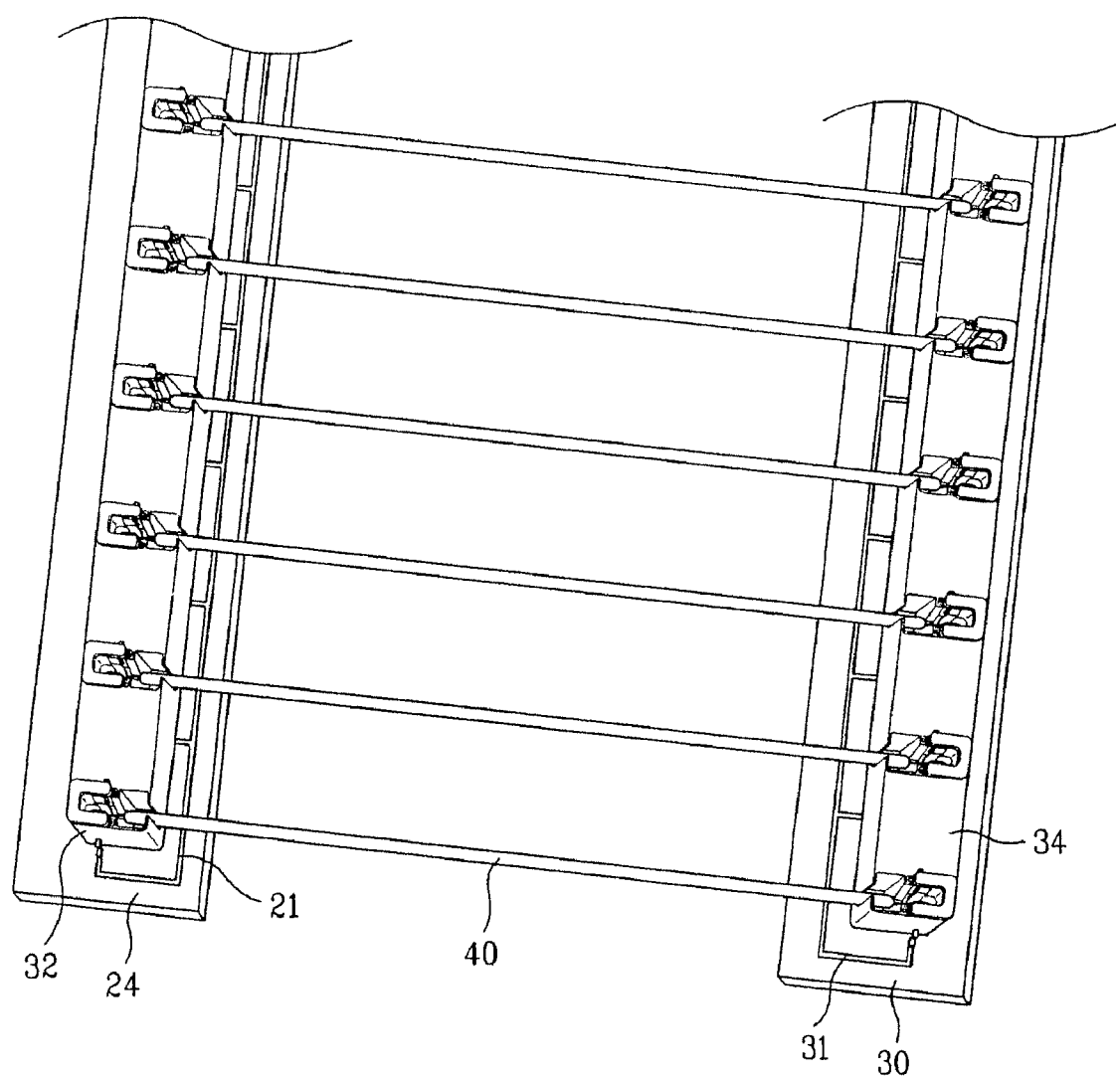
FIG. 8 is a perspective view illustrating another structure of the socket unit shown in FIG. 5
Figure 9:
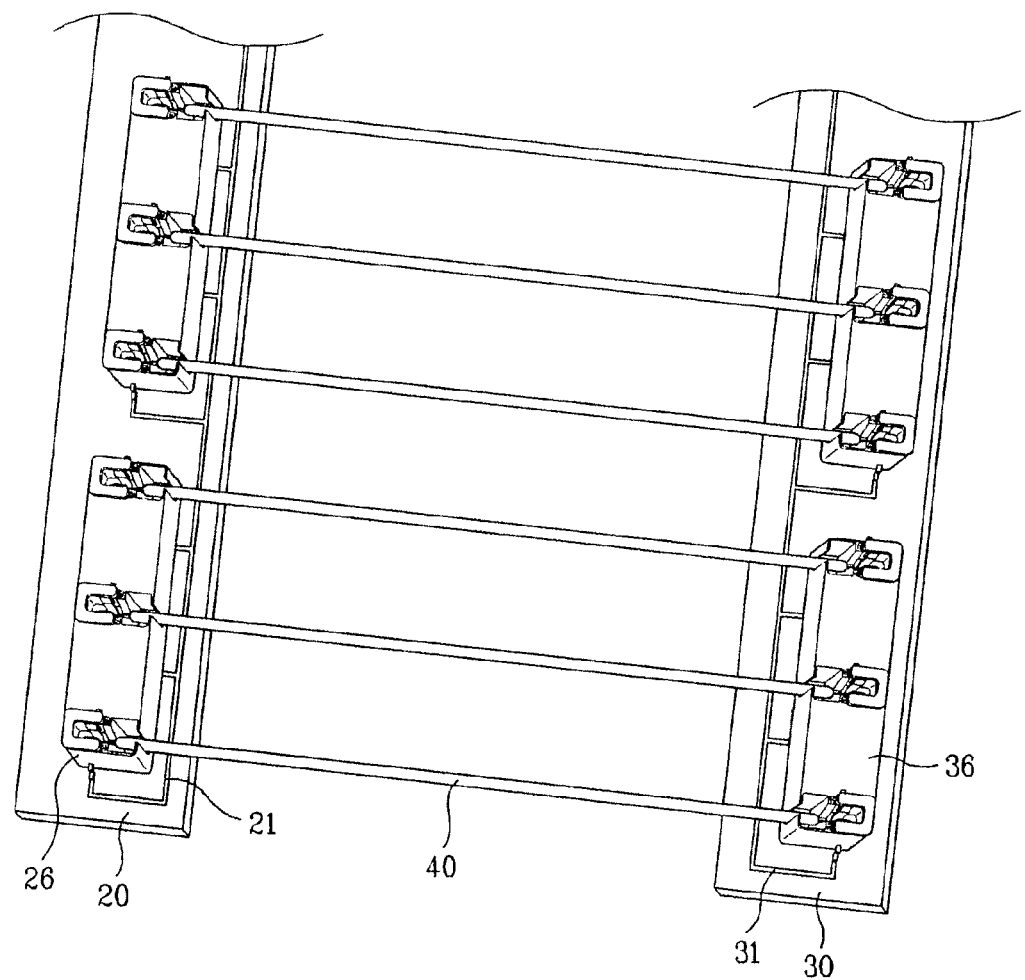
FIG. 9 is a perspective view illustrating another structure of the socket unit shown in FIG. 5.

FIGS. 8 and 9 illustrate another structures of the socket unit shown in FIG. 5. Referring to FIG. 8, a plurality of the first sockets 22 shown FIG. 5 may be formed from an integral socket body 24. Also, a plurality of the second sockets 32 shown FIG. 5 may be formed from an integral socket body 23. Referring to FIG. 9, a plurality of the first sockets 22 shown FIG. 5 may be divided into a plurality of groups, and each of the groups may be formed from one integral socket body 26. Also, a plurality of the second sockets 32 shown FIG. 5 may be divided into a plurality of groups, and each of the groups may be formed from one integral socket body 36.

As described above, the lamp-connection socket according to the present invention, and the backlight unit and LCD device using the same have the following advantages.

In the lamp-connection socket according to the present invention, the clip connected to the lamp electrode and the balance device of lamp to uniformly maintain the current balance in the lamp are formed as one with the body, whereby the lamp-connection structure is simplified.

In the backlight unit and LCD device according to the present invention, the lamp may be connected to the socket that includes an integrated a clip and balance device, thereby simplifying the lamp-connection structure.

In the backlight unit and LCD device according to the present invention, the lamp may be connected to the socket that includes the integrated clip and balance device, and the inverter may be connected to the socket using either a wire-connection method or pin-connection method to simplify the structure of the backlight unit.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A lamp-connection socket for a lamp for a display device, comprising:
   a body that includes a lamp receiving portion that supports an end portion of a lamp;
   a first terminal that extends from within the body to the outside of the body to receive a potential for driving the lamp;
   a second terminal extending from within the body to the outside of the body;
   a balance device including a high-voltage capacitor or inductor and arranged within the body and electrically connected to the first terminal and the second terminal, wherein the first terminal extends from a first side surface of the body to the outside of the body, and the second terminal extends from a second side surface, opposite to the first side surface, of the body to the outside of the body; and
   a clip arranged in the body that releaseably clamps a lamp electrode at the end of the lamp, the clip electrically connected to the balance device.

2. The lamp socket according to claim 1, further comprising a lamp electrode supporter arranged within the body that supports the lamp electrode.

3. The lamp socket according to claim 1, further comprising a clip fixer movably supported on the body that compresses the clip to hold the lamp electrode in electrical connection with the clip.

* * * * *